(12) United States Patent
Seon

(10) Patent No.: US 11,780,391 B2
(45) Date of Patent: Oct. 10, 2023

(54) UNDER-PROTECTOR FASTENING STRUCTURE OF VEHICLE

(71) Applicants: Hyundai Motor Company, Seoul (KR); Kia Corporation, Seoul (KR)

(72) Inventor: Dong Ku Seon, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 17 days.

(21) Appl. No.: 17/648,979

(22) Filed: Jan. 26, 2022

(65) Prior Publication Data

US 2023/0121390 A1 Apr. 20, 2023

(30) Foreign Application Priority Data

Oct. 18, 2021 (KR) .................. 10-2021-0138388

(51) Int. Cl.
*B60R 19/24* (2006.01)
*B60R 19/54* (2006.01)
(52) U.S. Cl.
CPC .............. *B60R 19/24* (2013.01); *B60R 19/54* (2013.01)
(58) Field of Classification Search
CPC ....... B60R 19/38; B60R 19/023; B60R 19/24; B60R 19/54; B60R 2019/486; B62D 21/155; B62D 25/20; B62D 29/041; B62D 35/02
USPC ............ 293/117; 296/187.08, 184.1, 193.07, 296/204, 35.1
See application file for complete search history.

(56) References Cited

U.S. PATENT DOCUMENTS

| 9,902,353 | B1* | 2/2018 | Espejo | .................... B60R 19/44 |
| 10,173,619 | B2* | 1/2019 | Cha | ....................... B62D 35/007 |
| 2017/0129448 | A1* | 5/2017 | Farooq | .................... B60R 19/38 |
| 2019/0381961 | A1* | 12/2019 | Farooq | .................... B60R 19/38 |

FOREIGN PATENT DOCUMENTS

EP 3006249 A1 * 4/2016 ............. B60K 11/04

* cited by examiner

*Primary Examiner* — Joseph D. Pape
*Assistant Examiner* — Veronica M Shull
(74) *Attorney, Agent, or Firm* — Slater Matsil, LLP

(57) ABSTRACT

An under-protector fastening structure includes a bumper assembly coupled to a chassis frame, wherein the bumper assembly includes a bumper inner member and a bumper cover coupled to an outer side of the bumper inner member, and an under-protector coupled to the bumper inner member of the bumper assembly in a direction vertical to a length direction of a vehicle body, wherein the under-protector includes an under-protector mounting assembly coupled to the bumper inner member and an under-protector panel coupled to the under-protector mounting assembly, and wherein the under-protector mounting assembly includes a pipe member extending in the direction vertical to the length direction of the vehicle body, a mounting bracket coupled to the pipe member and the bumper inner member, and an under-protector fixing bracket having a first side coupled to the mounting bracket and a second side coupled to the under-protector panel.

20 Claims, 22 Drawing Sheets

UNDER-PROTECTOR FASTENING STRUCTURE OF VEHICLE

CROSS-REFERENCE TO RELATED APPLICATIONS

This application claims the benefit of Korean Patent Application No. 10-2021-0138388, filed on Oct. 18, 2021, which application is hereby incorporated herein by reference.

TECHNICAL FIELD

The present invention relates to an under-protector fastening structure of a vehicle.

BACKGROUND

In general, a front end module (FEM) with a radiator is mounted in front of a vehicle body, and a bumper is installed to improve aerodynamic performance while driving as well as to provide cushioning in case of a front collision.

Particularly, as illustrated in FIGS. 1 and 2, in the case of heavy dump trucks and rough-road vehicles (e.g., hydrogen electric heavy trucks), a ground clearance of a bumper 2 needs to be raised, and thus, a lower end of a radiator 3 is inevitably exposed to the front.

In the related art, an under-protector mounting assembly is fastened to a chassis frame 1 in the front portion of the vehicle body, the bumper 2 is fastened to the chassis frame 1, and an under-protector panel 4 is fastened to the under-protector mounting assembly in an upward direction from the underside of the vehicle.

However, in the related art, since a worker enters the lower portion of the vehicle and fastens the under-protector panel 4 to the under-protector mounting assembly while looking up, foreign material may enter eyes of the worker or a musculoskeletal disease of the worker may occur, and thus, workability is reduced, and a man hour (M/H) loss occurs in a mass production process.

In addition, since the under-protector panel 4 is fastened to the under-protector mounting assembly by a fastening bolt, the externally protruding fastening bolt may deteriorate an appearance quality and may be corroded and damaged. In addition, a cross-section area increases in order to implement a shape of a fastening bolt recessed structure, and thus, the marketability may deteriorate due to the invasion of a package approach angle.

The above information disclosed in this Background section is only for enhancement of understanding of the background of the invention, and therefore it may contain information that does not form the prior art that is already known to a person of ordinary skill in the art.

SUMMARY

The present invention relates to an under-protector fastening structure of a vehicle. Particular embodiments relate to an under-protector fastening structure of a vehicle in which bolt coupling is eliminated by integrally configuring a radiator under-protector of a vehicle with a bumper.

Embodiments of the present invention may provide an under-protector fastening structure of a vehicle having advantages of eliminating a fastening bolt exposed to an outside and being installed within a package approach angle by weld-coupling an under-protector fixing bracket to an under-protector panel.

An exemplary embodiment of the present invention provides an under-protector fastening structure of a vehicle including a bumper assembly coupled to a front portion of a vehicle body and an under-protector coupled to the bumper assembly in a direction vertical to a length direction of the vehicle body.

The bumper assembly may be coupled to a chassis frame extending in the length direction of the vehicle body, and may include a bumper inner member coupled to the under-protector and a bumper cover coupled to an outer side of the bumper inner member.

The under-protector may include an under-protector mounting assembly coupled to the bumper inner member and an under-protector panel coupled to the under-protector mounting assembly.

The under-protector mounting assembly may include a pipe member extending in the direction vertical to the length direction (e.g., perpendicular in a width) of the vehicle body, a mounting bracket coupled to the pipe member and the bumper inner member, and an under-protector fixing bracket of which one side is coupled to the mounting bracket and the other side is coupled to the under-protector panel.

The mounting bracket may be coupled to a bumper fixing bracket attached to the bumper inner member.

The under-protector fastening structure of a vehicle according to an exemplary embodiment of the present invention may further include a pipe support bracket supporting the pipe member, and the under-protector panel may be welded to the pipe support bracket.

The pipe support bracket may extend in a direction vertical to an extension direction of the pipe member.

The under-protector fixing bracket may be coupled to a step mounting member installed in a cap hinge lower bracket coupled to a side portion of the chassis frame.

The mounting bracket may be formed in a bent shape and a reinforcing member may be attached to the bent portion.

The step mounting member may be coupled to the cap hinge lower bracket in the direction vertical to the length direction of the vehicle body.

A step mounting member fixing bracket may be interposed between the under-protector fixing bracket and the step mounting member.

One surface of the step mounting member fixing bracket may be bolt-coupled to the step mounting member and the other surface formed in a direction vertical to the one surface may be bolt-coupled to the under-protector fixing bracket.

A strength-increasing forming may be formed in a bent portion between the one surface and the other surface of the step mounting member fixing bracket.

The under-protector panel may include a tool entry opening, and the mounting bracket may be bolt-fastened to the other surface of the step mounting member fixing bracket by a tool entering the tool entry opening.

Both edge flanges formed in a direction vertical to a surface of the under-protector panel may be formed to have a variable height.

The flange may be provided so that the height increases toward a rear side of the vehicle body.

An anti-sagging forming (e.g., an anti-sagging forming member) formed in a zigzag (e.g., stepped portion) shape in a direction vertical to the under-protector panel surface may be provided on a rear side of the under-protector panel surface in the vehicle.

A strength-increasing forming protruding toward the vehicle body in a direction vertical to the under-protector panel surface may be formed at each of both edges of the under-protector panel surface.

According to an exemplary embodiment of the present invention, by applying a part in which the bumper and under-protector are integrated with each other, there is no need to assemble the under-protector separately, and thus, it is possible to reduce a production assemble cost.

By weld-coupling the under-protector panel to the under-protector mounting assembly, it is possible to install the under-protector within the package approach angle, and thus, it is possible to improve marketability by securing a high ground clearance of the vehicle.

By eliminating a bolt exposed to the outside when installing the under-protector, corrosion of the bolt can be solved, and thus, it is possible to eliminate detachment of the protector panel generated when the bolt is corroded.

It is possible to mount and assemble the under-protector integrally with the bumper and fasten the bolt through the tool entry opening in the front portion of the under-protector, and thus, it is possible to prevent a worker from musculoskeletal diseases and prevent foreign materials from entering eyes of the worker.

By applying the flange of the under-protector panel edge to a variable shape, it is possible to prevent sagging of the under-protector.

By forming strength-increasing forming on the under-protector panel surface, it is possible to improve strength of the under-protector.

Figure 1:
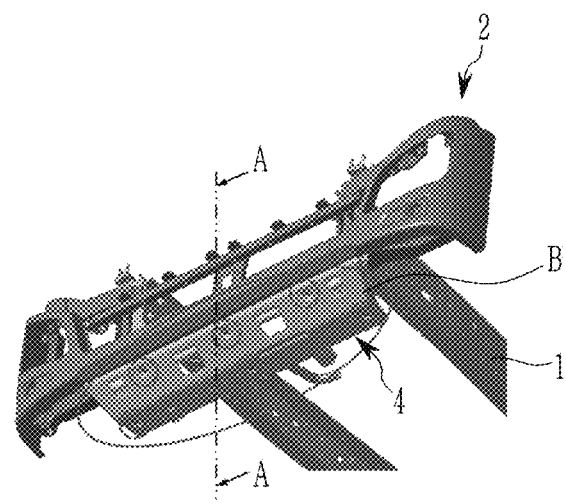
FIG. 1 is a view illustrating a bumper fastening structure of an existing under-protector of a vehicle.
Figure 2:
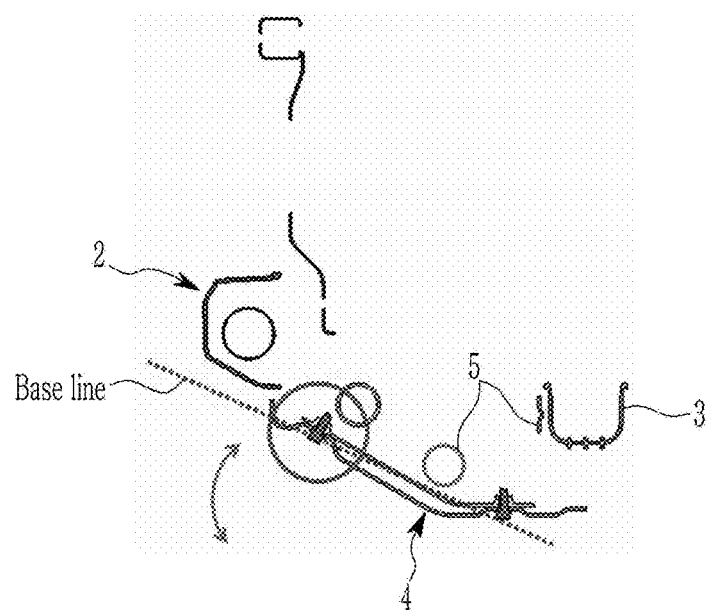
FIG. 2 is a view schematically illustrating a cross section taken along line "A-A" of FIG. 1.

The following elements may be used in connection with the figures to describe various embodiments of the present invention.

100: under-protector fastening structure of vehicle
7: radiator
10: bumper assembly
12: bumper inner member
14: bumper cover
15: bumper fixing bracket
16: step mounting member
18: cap hinge lower bracket
20: under-protector
22: under-protector panel
24: step mounting member fixing bracket
30: chassis frame
40: under-protector mounting assembly
42: pipe member
44: pipe support bracket
46: mounting bracket
48: under-protector fixing bracket
49: reinforcing member
B: bolt
O: tool entry opening
S: flange
K: strength-increasing forming
P: anti-sagging forming

DETAILED DESCRIPTION OF ILLUSTRATIVE EMBODIMENTS

Hereinafter, with reference to the accompanying drawings, exemplary embodiments of the present invention will be described in detail so that a person of an ordinary skill in the technical field to which the present invention belongs can easily practice. The present invention may be implemented in several different forms and is not limited to the exemplary embodiments described herein.

In addition, in various exemplary embodiments, constituent elements having the same configuration will be representatively described in an exemplary embodiment using the same reference numerals, and only configurations different from the exemplary embodiment will be described in other exemplary embodiments.

Please note that the drawings are schematic and not drawn to scale. Relative dimensions and ratios of parts in the drawings are illustrated exaggerated or reduced in size for clarity and convenience in the drawings, and any dimensions are illustrative only and not limiting. In addition, the same reference sign is used to indicate similar features with respect to the same structure, element, or part illustrated in two or more drawings. When a part is referred to as being "above" or "on" another part, the part may be directly on another part, or still another part may be interposed therebetween.

An exemplary embodiment of the present invention specifically represents one exemplary embodiment of the present invention. As a result, numerous variations of the illustration are expected. Accordingly, the exemplary embodiment is not limited to a specific form of the illustrated area, and includes, for example, a deformation of the form by manufacturing.

Hereinafter, with reference to the accompanying drawings, an under-protector fastening structure of a vehicle according to exemplary embodiments of the present invention will be described in detail.

Figure 3:
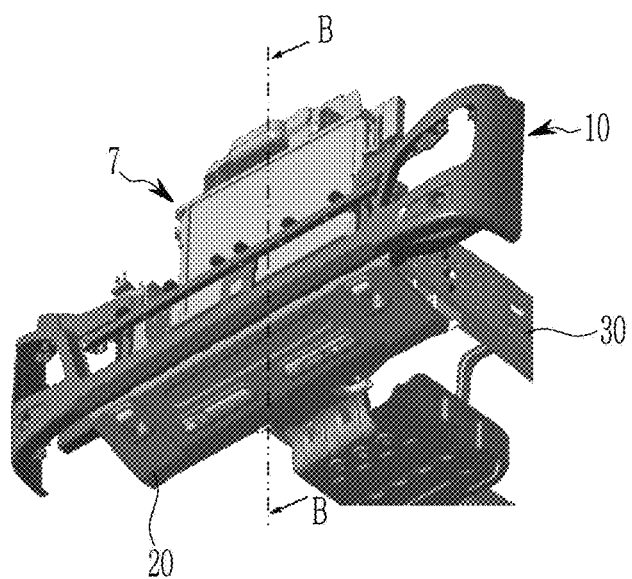
FIG. 3 is a view illustrating an under-protector fastening structure of a vehicle according to an exemplary embodiment of the present invention.
Figure 4:
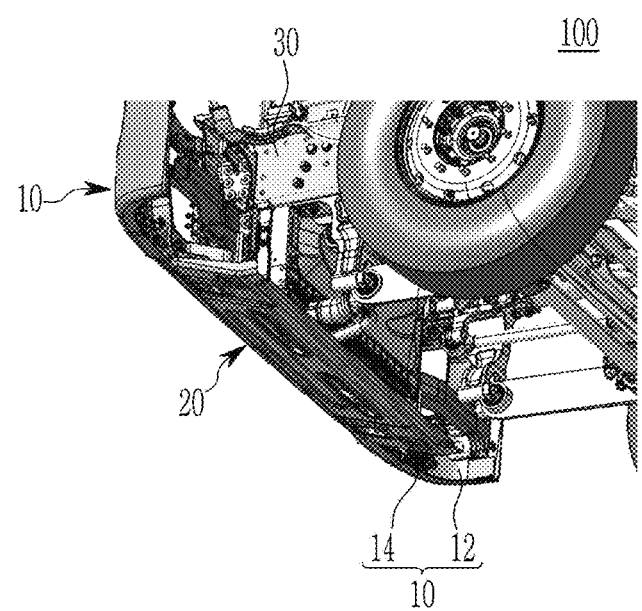
FIG. 4 is a perspective view when a state in which an under-protector fastening structure of a vehicle according to an exemplary embodiment of the present invention is applied to a vehicle is viewed from below.
Figure 5:
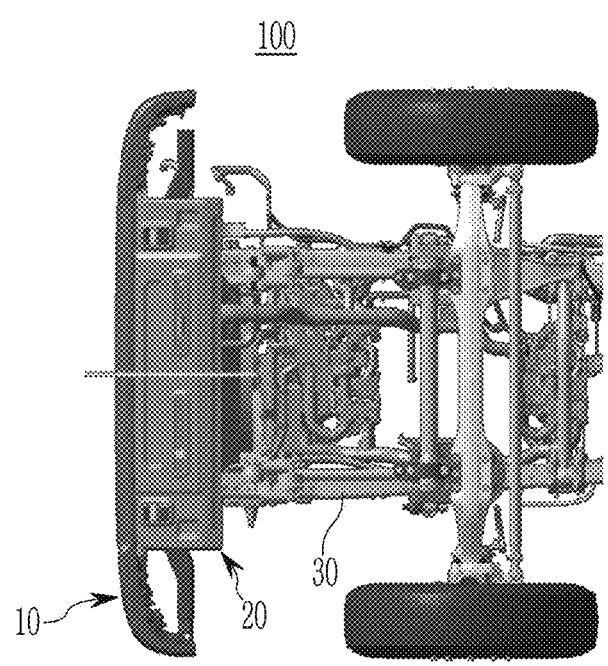
FIG. 5 is a top plan view when a state in which an under-protector fastening structure of a vehicle according to an exemplary embodiment of the present invention is applied to the vehicle is viewed from below.
Figure 6:
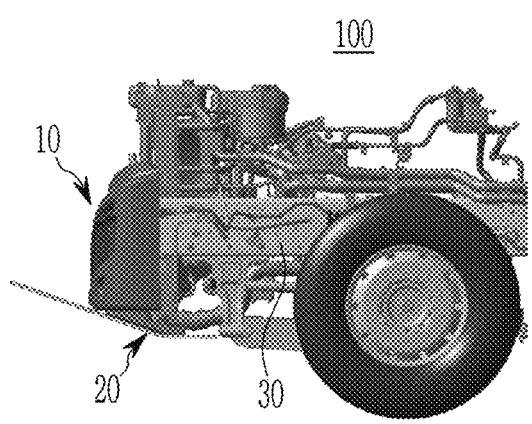
FIG. 6 is a side view when a state in which an under-protector fastening structure of a vehicle according to an exemplary embodiment of the present invention is applied to the vehicle is viewed from a side.
Figure 7:
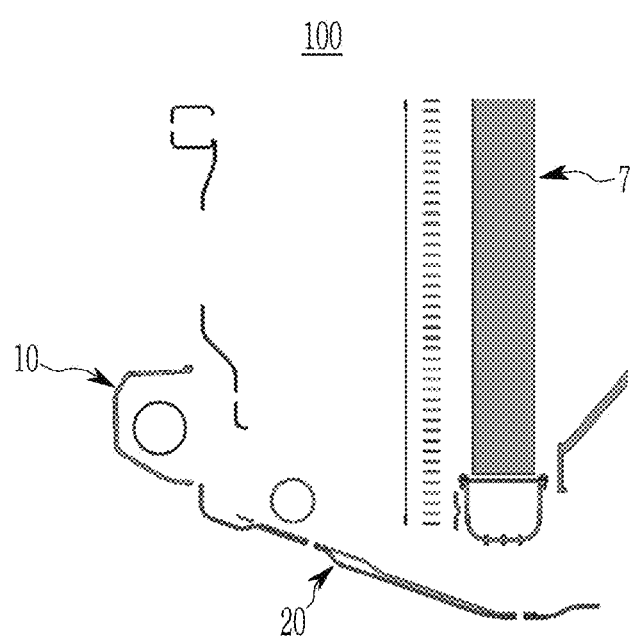
FIG. 7 is a view schematically illustrating a cross section taken along line "B-B" of FIG. 3.

FIG. 3 is a view illustrating an under-protector fastening structure of a vehicle according to an exemplary embodiment of the present invention, FIG. 4 is a perspective view when a state in which an under-protector fastening structure of a vehicle according to an exemplary embodiment of the present invention is applied to a vehicle is viewed from below, FIG. 5 is a top plan view when a state in which an under-protector fastening structure of a vehicle according to an exemplary embodiment of the present invention is applied to a vehicle is viewed from below, FIG. 6 is a side view when a state in which an under-protector fastening structure of a vehicle according to an exemplary embodiment of the present invention is applied to a vehicle is viewed from a side, and FIG. 7 is a view schematically illustrating a cross section taken along line "B-B" of FIG. 3.

Referring to FIG. 3 to FIG. 7, an under-protector fastening structure 100 of a vehicle according to an exemplary embodiment of the present invention is mounted in front of chassis frames 30 of a vehicle body extending in a length direction on both sides of a vehicle, and a radiator 7 is installed between the chassis frames 30. The under-protector fastening structure 100 includes a bumper assembly 10 and an under-protector 20.

The bumper assembly 10 is coupled to a front side of the vehicle body, and the under-protector 20 is coupled to a lower side of the bumper assembly 10 in a direction vertical to the length direction of the vehicle body in a lower portion of the radiator 7.

The bumper assembly 10 is coupled to the chassis frame 30 extending in the length direction of the vehicle body, and includes a bumper inner member 12 coupled to the under-protector 20 and a bumper cover 14 coupled to the outside of the bumper inner member 12. The bumper inner member 12 may be made of a steel material and is coupled to the under-protector 20. The bumper cover 14 may be made of a plastic material.

The under-protector 20 prevents the lower side of the radiator 7 from being damaged when the vehicle collides with an external obstacle during operation of the vehicle, is coupled to the bumper assembly 10, and is coupled to the front portion of the chassis frame 30 of the vehicle body in a horizontal direction along a front-rear direction of the vehicle body.

This under-protector 20 includes an under-protector mounting assembly 40 (see FIG. 8) coupled to the bumper inner member 12, and an under-protector panel 22 (see FIG. 9) coupled to the under-protector mounting assembly 40.

Figure 8:
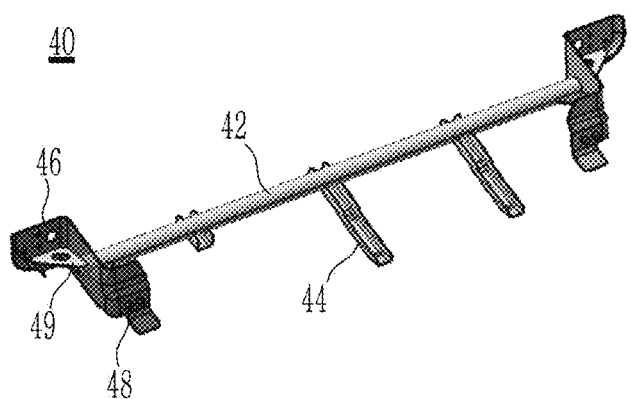
FIG. 8 is a view illustrating an under-protector mounting assembly of an under-protector fastening structure of a vehicle according to an exemplary embodiment of the present invention.

FIG. 8 is a view illustrating an under-protector mounting assembly of the under-protector fastening structure of a vehicle according to an exemplary embodiment of the present invention.

Referring to FIG. 8, in an exemplary embodiment of the present invention, the under-protector mounting assembly 40 is for mounting the under-protector panel 22, which will be further described below, on a lower front side of the chassis frame 30 of the vehicle body.

The under-protector mounting assembly 40 includes a pipe member 42, a pipe support bracket 44 which is attached to the pipe member 42 to support the pipe member 42, a mounting bracket 46 which is coupled to each of both sides of the pipe member 42, and an under-protector fixing bracket 48.

The pipe support bracket 44 may extend in a direction vertical to an extension direction of the pipe member 42, and may be provided in plural.

The mounting bracket 46 is coupled to the bumper inner member 12 through a bumper fixing bracket 15 to be described below.

One side of the under-protector fixing bracket 48 may be coupled to the mounting bracket 46 and the other side thereof may be coupled to the under-protector panel 22. The mounting bracket 46 and the under-protector fixing bracket 48 may be bolt-coupled to each other or integrally formed with each other.

Figure 9:
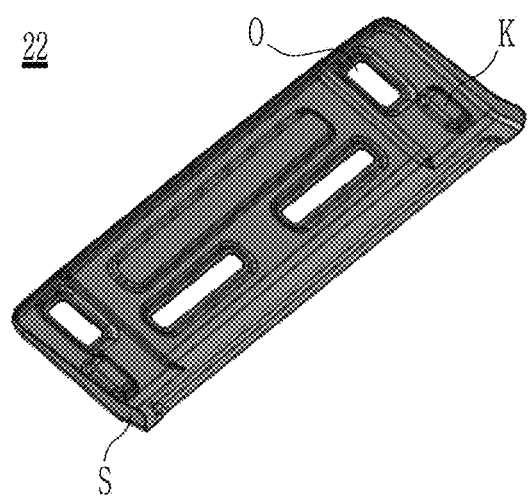
FIG. 9 is a view illustrating an under-protector panel of an under-protector fastening structure of a vehicle according to an exemplary embodiment of the present invention.

FIG. 9 is a view illustrating an under-protector panel of the under-protector fastening structure of a vehicle according to an exemplary embodiment of the present invention.

Referring to FIG. 9, the under-protector panel 22 may have a shape bent in the length direction of the vehicle, and include a tool entry opening O, a flange S, and a strength-increasing forming K.

The tool entry opening O may be formed toward a lower front of the vehicle, and a tool enters the tool entry opening O so that the mounting bracket 46 of the under-protector mounting assembly 40 may be bolt-fastened to the other surface of a step mounting member fixing bracket 24 to be described below.

The flange S may be formed at each of both edges in a direction vertical to the surface of the under-protector panel 22, and may be formed to have a variable height. The flange S may be provided so that a height thereof gradually increases toward a rear of the vehicle body.

The strength-increasing forming K may be formed on each of both edges of the surface of the under-protector panel 22, and may protrude toward the vehicle body in a direction vertical to the surface of the under-protector panel 22. The surface of the under-protector panel 22 in which the strength-increasing forming K is formed may be welded to the under-protector fixing bracket 48, and thus, the strength of the under-protector panel 22 can be improved.

Figure 10:
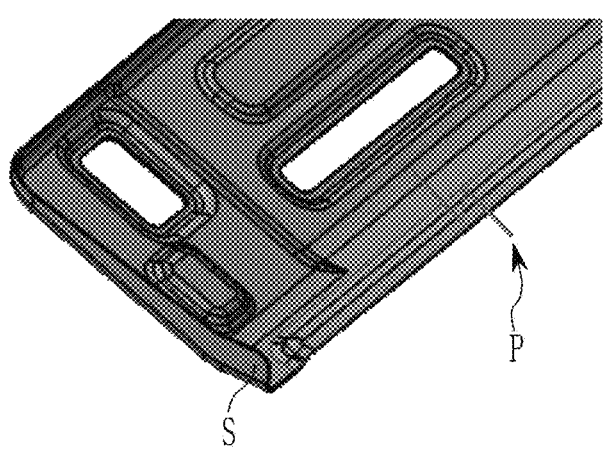
FIG. 10 is a view illustrating a structure in which an anti-sagging forming P is formed in an under-protector panel of an under-protector fastening structure of a vehicle according to an exemplary embodiment of the present invention.

FIG. 10 is a view illustrating a structure in which an anti-sagging forming P is formed in the under-protector panel 22 of the under-protector fastening structure of a vehicle according to an exemplary embodiment of the present invention. The anti-sagging forming P formed in a zigzag shape ("Z" shape) in the direction vertical to the surface of the under-protector panel 22 may be formed on a rear side of the surface of the under-protector panel 22 in the vehicle. The anti-sagging forming P can reduce vibrations of the under-protector panel 22 while the vehicle travels or when the engine is idle after stopping, and can prevent a central portion of the under-protector panel 22 from sagging.

Figure 11:
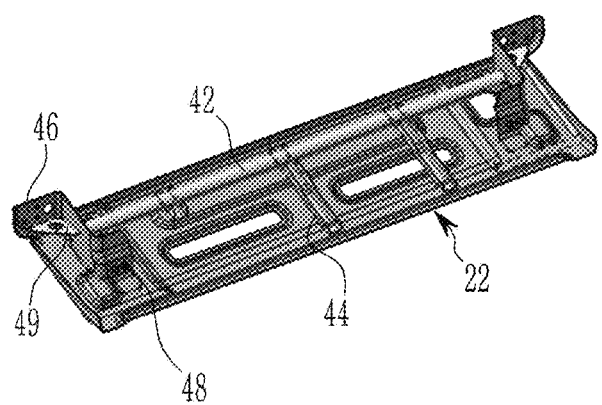
FIG. 11 and FIG. 12 are views illustrating a state in which an under-protector panel of an under-protector fastening structure of a vehicle according to an exemplary embodiment of the present invention is coupled to an under-protector mounting assembly.
Figure 12:
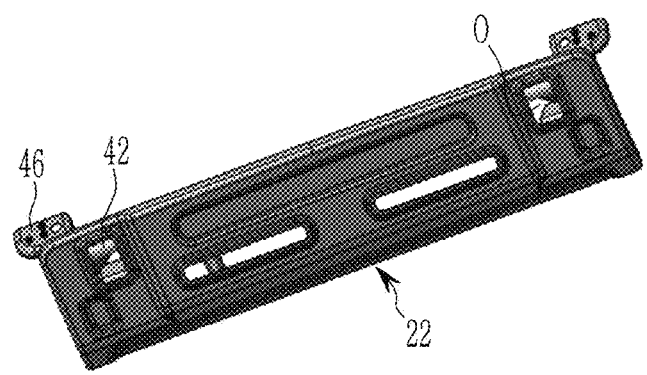

FIG. 11 and FIG. 12 are views illustrating a state in which the under-protector panel of the under-protector fastening structure of a vehicle according to an exemplary embodiment of the present invention is coupled to the under-protector mounting assembly.

Referring to FIGS. 11 and 12, the under-protector panel 22 may be welded to the pipe support bracket 44 and weld-coupled to the under-protector fixing bracket 48 of the under-protector mounting assembly 40 via the strength-increasing forming K portion.

The mounting bracket 46 is formed in a bent form, and a reinforcing member 49 is attached to the bent portion to supplement the strength of the mounting bracket 46.

Figure 13:
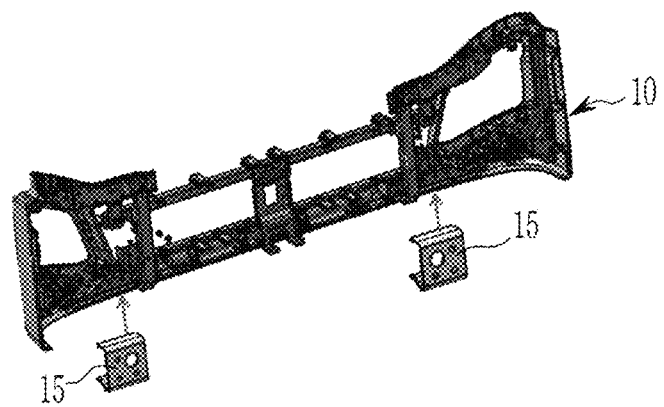
FIG. 13 is a view illustrating a state in which a bumper fixing bracket is attached to a bumper inner member of a bumper assembly of an under-protector fastening structure of a vehicle according to an exemplary embodiment of the present invention.

FIG. 13 is a view illustrating a state in which a bumper fixing bracket is attached to a bumper inner member of a bumper assembly of the under-protector fastening structure of a vehicle according to an exemplary embodiment of the present invention.

As illustrated in FIG. 13, a bumper fixing bracket 15 is attached to the bumper inner member 12, and is bolt-coupled to the mounting bracket 46 so that the under-protector fastening structure 100 of a vehicle of embodiments of the present invention can be fixed to the bumper assembly 10. A worker inserts the tool through the tool entry opening O formed in the under-protector panel 22, and thus, the mounting bracket 46 can be bolt-coupled to the bumper fixing bracket 15.

Figure 14:
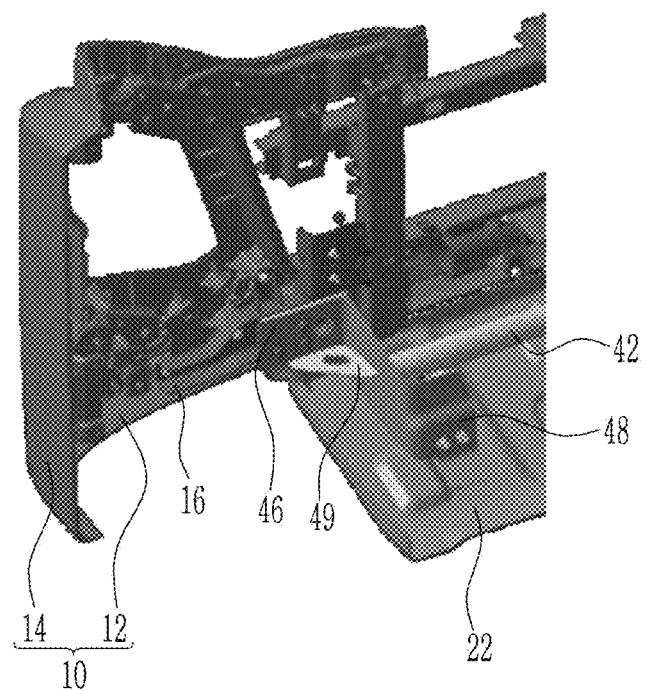
FIGS. 14, 15A, and 15B are views illustrating a state in which an under-protector mounting assembly of an under-protector fastening structure of a vehicle according to an exemplary embodiment of the present invention is coupled to a bumper assembly.
Figure 15A:
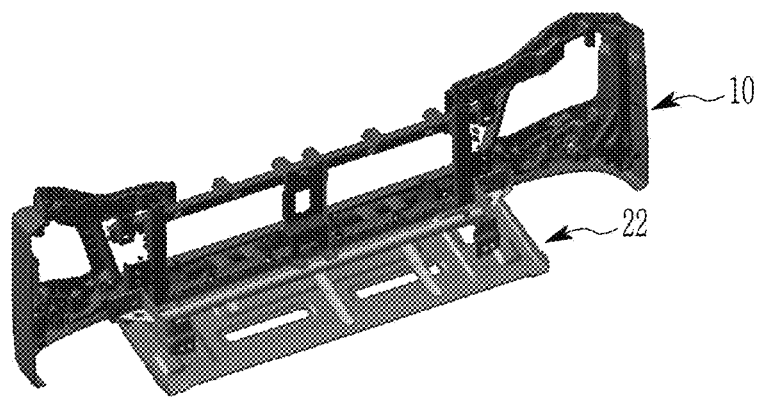
Figure 15B:
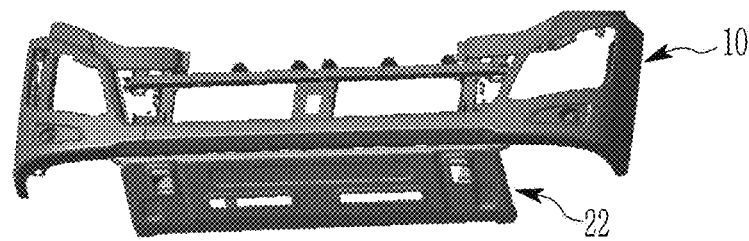

FIGS. 14, 15A, and 15B are views illustrating a state in which the under-protector mounting assembly of the under-protector fastening structure of a vehicle according to an exemplary embodiment of the present invention is coupled to the bumper assembly.

Referring to FIGS. 14, 15A, and 15B, the mounting bracket 46 of the under-protector mounting assembly 40 may be bolt-coupled to the step mounting member 16. The step mounting member 16 can be mounted on the bumper inner member 12 in the direction vertical to the length direction of the vehicle body. The step mounting member 16 may be coupled to a cap hinge lower bracket 18 to be described below.

The mounting bracket 46 can not only be bolt-coupled to the step mounting member 16 but also can be bolt-coupled to the bumper fixing bracket 15 attached to the bumper inner member 12, and thus, the under-protector panel 22 can be more firmly fixed to the bumper inner member 12.

Figure 16:
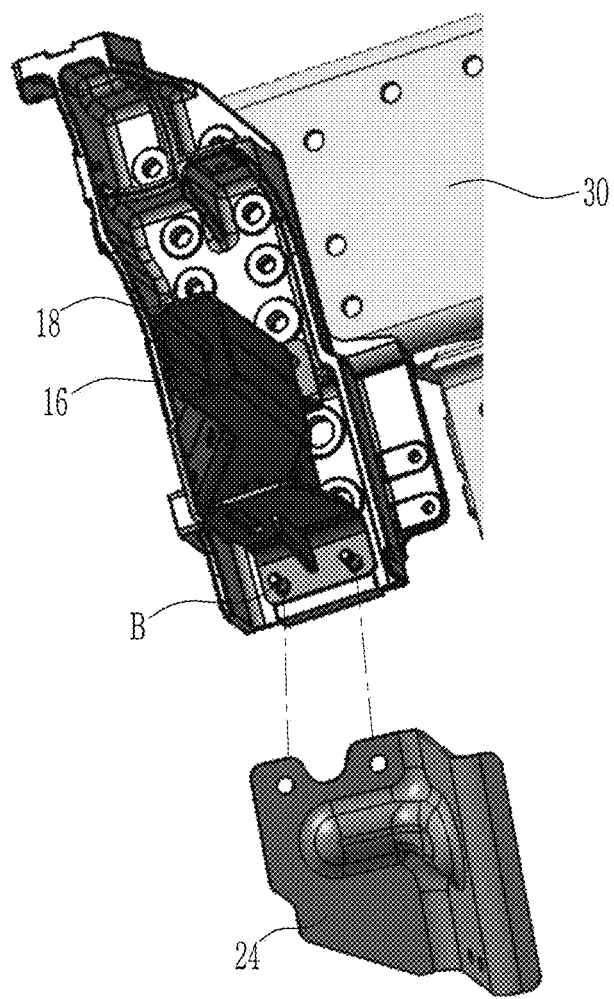
FIG. 16 is a view illustrating a state in which a cap hinge lower bracket and a step mounting member are installed in a chassis frame of an under-protector fastening structure of a vehicle according to an exemplary embodiment of the present invention.

FIG. 16 is a view illustrating a state in which a cap hinge lower bracket and a step mounting member are installed in a chassis frame of the under-protector fastening structure of a vehicle according to an exemplary embodiment of the present invention.

Referring to FIG. 16, the cap hinge lower bracket 18 may be fixedly installed in a side portion of the chassis frame 30, and the step mounting member 16 may be bolt-coupled to the cap hinge lower bracket 18. The cap hinge lower bracket 18 may be installed downwards in a direction vertical to the length direction of the chassis frame 30, and the step mounting member may be installed toward the outside of the chassis frame 30 in a direction vertical to the cap hinge lower bracket 18.

Figure 17:
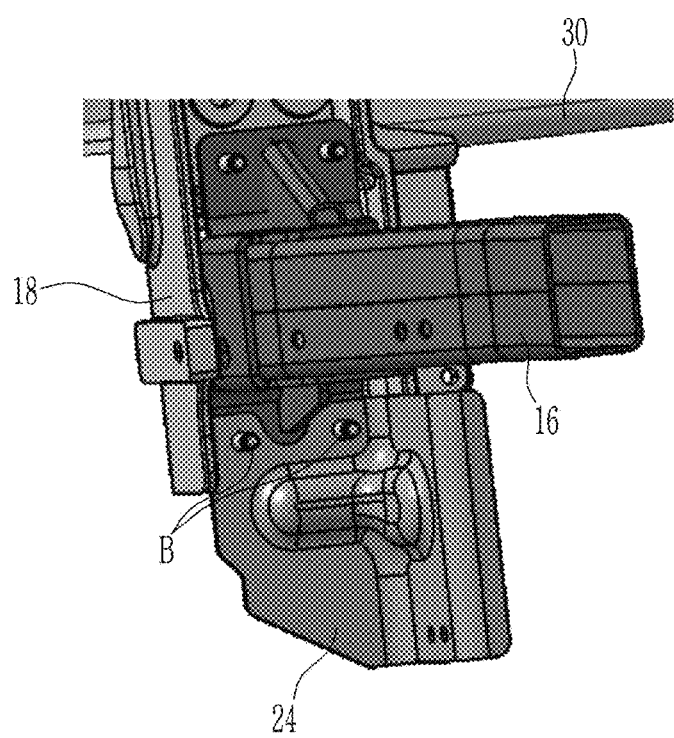
FIG. 17 is a view illustrating a state in which a step mounting member fixing bracket of an under-protector fastening structure of a vehicle according to an exemplary embodiment of the present invention is coupled to a step mounting member.

FIG. 17 is a view illustrating a state in which a step mounting member fixing bracket of the under-protector fastening structure of a vehicle according to an exemplary embodiment of the present invention is coupled to the step mounting member.

Referring to FIG. 17, the step mounting member fixing bracket 24 may be bolt-coupled to the step mounting member 16 with bolts B. One surface of the step mounting member fixing bracket 24 may be bolt-coupled to the step mounting member 16, and the other surface formed in a direction vertical to the one surface may be bolt-coupled to the under-protector fixing bracket 48. A strength-increasing forming may be formed at a bent portion between one surface and the other surface of the step mounting member fixing bracket 24 to increase the strength of the step mounting member fixing bracket 24.

Figure 18:
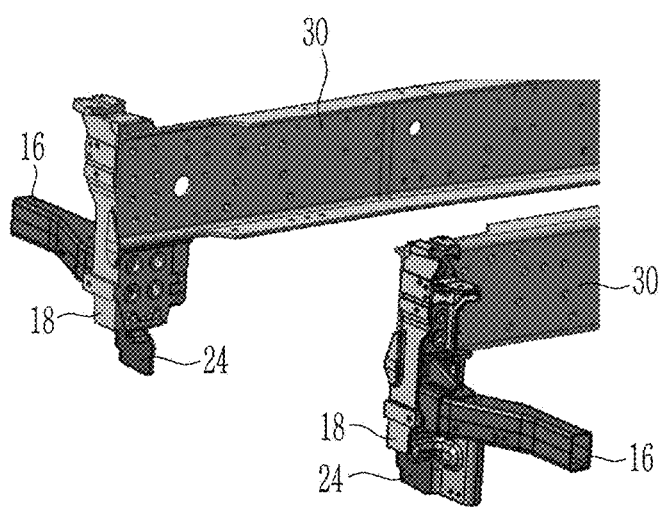
FIG. 18 is a view illustrating a state in which a cap hinge lower bracket, a step mounting member, and a step mounting member fixing bracket are installed in a chassis frame of an under-protector fastening structure of a vehicle according to an exemplary embodiment of the present invention.

FIG. 18 is a view illustrating a state in which the cap hinge lower bracket, the step mounting member, and the step mounting member fixing bracket are installed in the chassis frame of the under-protector fastening structure of a vehicle according to an exemplary embodiment of the present invention.

As illustrated in FIG. 18, the cap hinge lower bracket 18 is coupled to a front portion of the chassis frame 30 to extend downward in a direction vertical to the length direction of the chassis frame 30, and the step mounting member 16 is coupled toward the outside of the chassis frame 30 in a direction vertical to the cap hinge lower bracket 18. In this case, in the step mounting member fixing bracket 24, an anti-deformation rib may be formed on a surface facing the outside of the vehicle body. The anti-deformation rib may serve to prevent the step mounting member fixing bracket 24 from being deformed by an impact force from the front to the rear of the vehicle.

Figure 19:
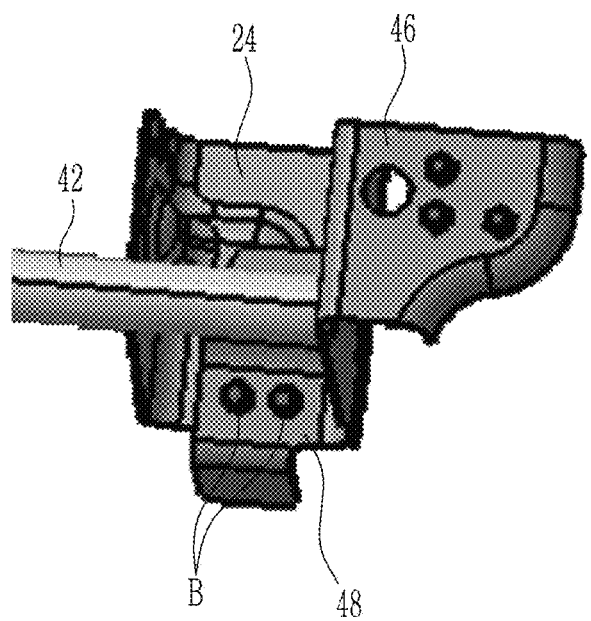
FIG. 19 is a view illustrating a state in which a step mounting member fixing bracket is coupled to a pipe under-protector fixing bracket of an under-protector fastening structure of a vehicle according to an exemplary embodiment of the present invention.

FIG. 19 is a view illustrating a state in which the step mounting member fixing bracket is coupled to a pipe under-protector fixing bracket of the under-protector fastening structure of a vehicle according to an exemplary embodiment of the present invention.

Referring to FIG. 19, the step mounting member fixing bracket 24 is bolt-coupled to the under-protector fixing bracket 48, and the step mounting member 16 is fixed to a bent side portion of the step mounting member fixing bracket 24. In addition, the pipe member 42 is coupled to a connection portion between the under-protector fixing bracket 48 and the mounting bracket 46, and thus, the connection portion can extend in the direction vertical to the length direction of the vehicle body.

Figure 20:
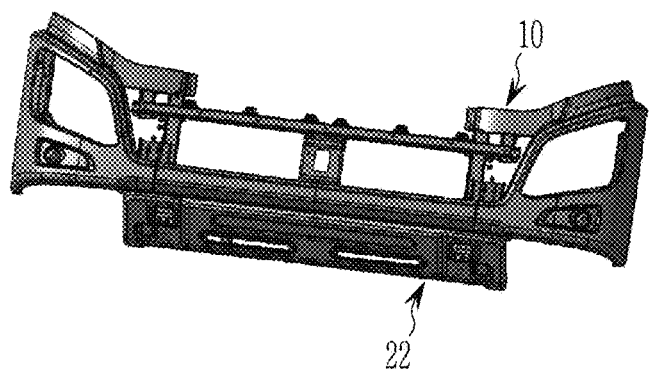
FIGS. 20 and 21 are views illustrating a state in which a mounting bracket a the step mounting member fixing bracket are bolt-fastened through a tool entry opening in an under-protector fastening structure of a vehicle according to an exemplary embodiment of the present invention.
Figure 21:
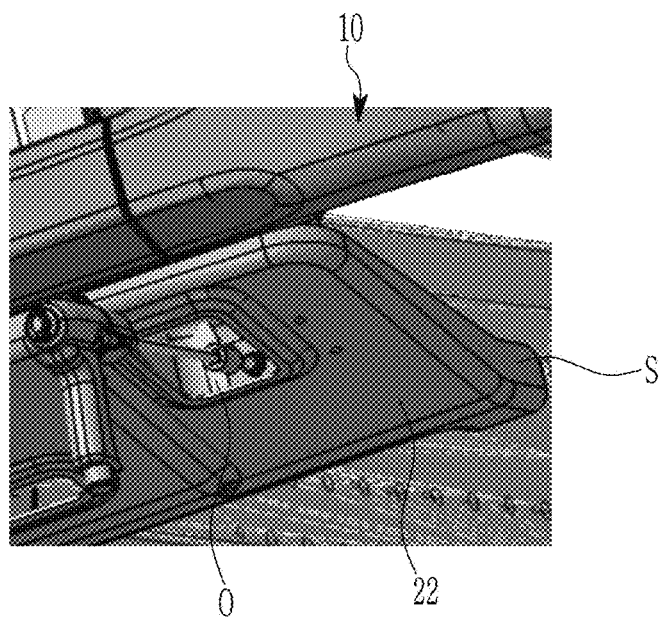

FIGS. 20 and 21 are views illustrating a state in which the mounting bracket and the step mounting member fixing bracket are bolt-fastened through a tool entry opening in the under-protector fastening structure of a vehicle according to an exemplary embodiment of the present invention.

Referring to FIGS. 20 and 21, the mounting bracket 46 and the step mounting member fixing bracket 24 may be bolt-fastened through the tool entry opening O formed in the under-protector panel 22. The worker can insert the tool through the tool entry opening O formed in the under-protector panel 22, and thus, it is possible to prevent the worker from musculoskeletal diseases and prevent foreign materials from entering eyes of the worker.

In this way, according to an exemplary embodiment of the present invention, by applying a part in which the bumper and under-protector are integrated with each other, there is no need to assemble the under-protector separately, and thus, it is possible to reduce a production assemble cost.

Moreover, by weld-coupling the under-protector panel to the under-protector mounting assembly, it is possible to install the under-protector within the package approach angle, and thus, it is possible to improve marketability by securing a high ground clearance of the vehicle.

In addition, by eliminating a bolt exposed to the outside when installing the under-protector, corrosion of the bolt can be solved, and thus, it is possible to eliminate detachment of the protector panel generated when the bolt is corroded.

Further, it is possible to mount and assemble the under-protector integrally with the bumper and fasten the bolt through the tool entry opening in the front portion of the under-protector, and thus, it is possible to prevent a worker from musculoskeletal diseases and prevent foreign materials from entering eyes of the worker.

Moreover, by applying the flange of the under-protector panel edge to a variable shape, it is possible to prevent the sagging of the under-protector.

Further, by forming strength-increasing forming on the under-protector panel surface, it is possible to improve the strength of the under-protector.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An under-protector fastening structure comprising:
a bumper assembly coupled to a chassis frame that extends in a length direction of a vehicle body, wherein the bumper assembly comprises a bumper inner member and a bumper cover coupled to an outer side of the bumper inner member; and
an under-protector coupled to the bumper inner member of the bumper assembly in a direction perpendicular in a width of the vehicle body, wherein the under-protector comprises an under-protector mounting assembly coupled to the bumper inner member and an under-protector panel coupled to the under-protector mounting assembly, and wherein the under-protector mounting assembly comprises:
a pipe member extending in the direction perpendicular in a width of the vehicle body;
a mounting bracket coupled to the pipe member and the bumper inner member; and
an under-protector fixing bracket having a first side coupled to the mounting bracket and a second side coupled to the under-protector panel.

2. The under-protector fastening structure of claim 1, wherein the mounting bracket is coupled to a bumper fixing bracket attached to the bumper inner member.

3. The under-protector fastening structure of claim 1, wherein both edge flanges formed in a direction vertical to a surface of the under-protector panel have a height that is variable.

4. The under-protector fastening structure of claim 3, wherein the height of each of the edge flanges increases toward a rear side of the vehicle body.

5. The under-protector fastening structure of claim 1, further comprising an anti-sagging forming member on a rear side of a surface of the under-protector panel, the anti-sagging forming member having a stepped portion shape in a direction vertical to the surface of the under-protector panel.

6. The under-protector fastening structure of claim 1, further comprising a strength-increasing forming member protruding toward the vehicle body in a direction vertical to a surface of the under-protector panel at each of both edges of the surface of the under-protector panel.

7. An under-protector fastening structure comprising:
a bumper assembly coupled to a chassis frame that extends in a length direction of a vehicle body, wherein the bumper assembly comprises a bumper inner member and a bumper cover coupled to an outer side of the bumper inner member; and
an under-protector coupled to the bumper inner member of the bumper assembly in a direction perpendicular in a width of the vehicle body, wherein the under-protector comprises an under-protector mounting assembly coupled to the bumper inner member and an under-protector panel coupled to the under-protector mounting assembly, and wherein the under-protector mounting assembly comprises:
a pipe member extending in the direction perpendicular in a width of the vehicle body;
a mounting bracket coupled to the pipe member and the bumper inner member;
an under-protector fixing bracket having a first side coupled to the mounting bracket and a second side coupled to the under-protector panel; and
a pipe support bracket configured to support the pipe member, wherein the under-protector panel is weld-coupled to the pipe support bracket.

8. The under-protector fastening structure of claim 7, wherein the pipe support bracket extends in a direction vertical to an extension direction of the pipe member.

9. The under-protector fastening structure of claim 8, further comprising a step mounting member installed in a cap hinge lower bracket coupled to a side portion of the chassis frame, wherein the under-protector fixing bracket is coupled to the step mounting member.

10. The under-protector fastening structure of claim 9, wherein the mounting bracket has a bent shape and a reinforcing member is attached to a bent portion of the bent shape.

11. The under-protector fastening structure of claim 9, wherein the step mounting member is coupled to the cap hinge lower bracket in the direction perpendicular in a width of the vehicle body.

12. The under-protector fastening structure of claim 11, further comprising a step mounting member fixing bracket interposed between the under-protector fixing bracket and the step mounting member.

13. The under-protector fastening structure of claim 12, wherein a first surface of the step mounting member fixing bracket is bolt-coupled to the step mounting member and a second surface of the step mounting member fixing bracket formed in a direction vertical to the first surface is bolt-coupled to the under-protector fixing bracket.

14. The under-protector fastening structure of claim 13, further comprising a strength-increasing forming in a bent portion between the first surface and the second surface of the step mounting member fixing bracket.

15. The under-protector fastening structure of claim 13, wherein the under-protector panel includes a tool entry opening, and the mounting bracket is bolt-fastened to the second surface of the step mounting member fixing bracket by a tool inserted in the tool entry opening.

16. A method of providing an under-protector fastening structure, the method comprising:

coupling a bumper assembly to a chassis frame that extends in a length direction of a vehicle body, wherein the bumper assembly comprises a bumper inner member and a bumper cover coupled to an outer side of the bumper inner member; and coupling an under-protector to the bumper inner member of the bumper assembly in a direction perpendicular in a width of the vehicle body, wherein the under-protector comprises an under-protector mounting assembly coupled to the bumper inner member and an under-protector panel coupled to the under-protector mounting assembly, and wherein the under-protector mounting assembly comprises:

a pipe member extending in the direction perpendicular in a width of the vehicle body;

a mounting bracket coupled to the pipe member and the bumper inner member; and an under-protector fixing bracket having a first side coupled to the mounting bracket and a second side coupled to the under-protector panel.

17. The method of claim 16, further comprising coupling the mounting bracket to a bumper fixing bracket attached to the bumper inner member.

18. The method of claim 16, wherein both edge flanges formed in a direction vertical to a surface of the under-protector panel have a height that is variable, and wherein the height increases toward a rear side of the vehicle body.

19. The method of claim 16, further comprising providing an anti-sagging forming member on a rear side of a surface of the under-protector panel, wherein the anti-sagging forming member has a stepped portion shape in a direction vertical to the surface of the under-protector panel.

20. The method of claim 16, further comprising providing a strength-increasing forming member protruding toward the vehicle body in a direction vertical to a surface of the under-protector panel at each of both edges of the surface of the under-protector panel.

\* \* \* \* \*